April 15, 1969  P. G. SARABER  3,438,701
CAMERA WITH PHOTOELECTRIC LIGHT METER
Filed March 10, 1966  Sheet 1 of 3
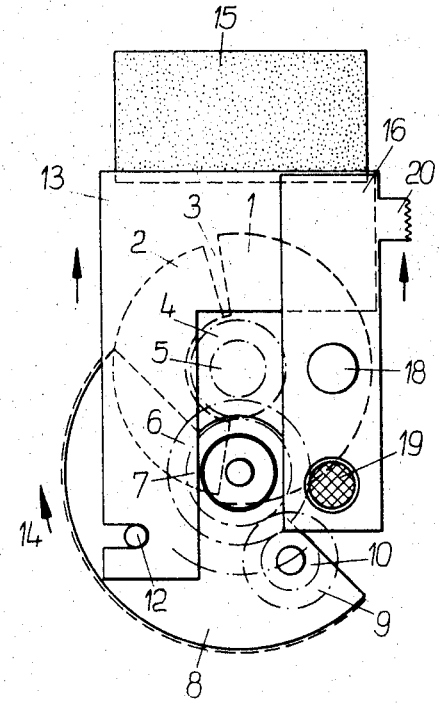
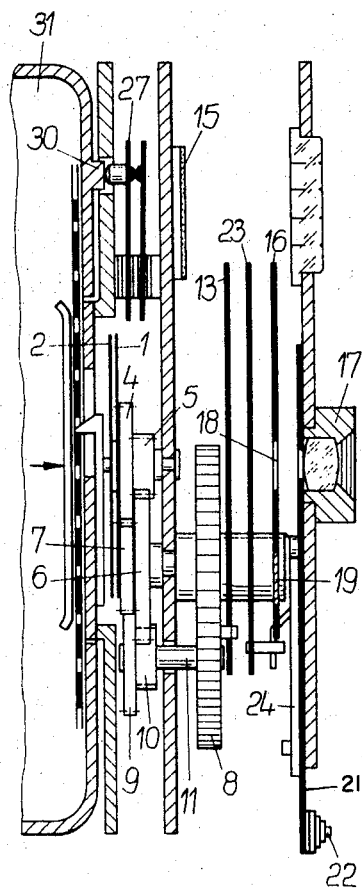
Inventor
Petrus G. Saraber

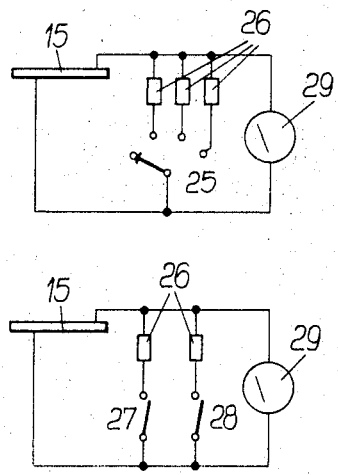
Fig. 4
Fig. 5
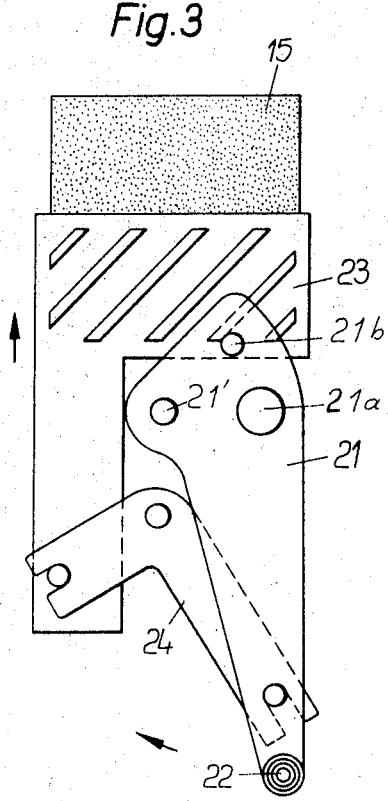
Fig. 3
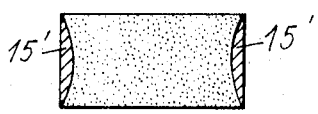
Fig. 6

United States Patent Office 3,438,701
Patented Apr. 15, 1969

3,438,701
CAMERA WITH PHOTOELECTRIC LIGHT METER
Petrus G. Saraber, Bruggtobel 802,
Wolfhalden, Switzerland
Filed Mar. 10, 1966, Ser. No. 533,286
Claims priority, application Austria, Mar. 15, 1965,
A 2,288/65
Int. Cl. G03b 7/08
U.S. Cl. 352—141                13 Claims

ABSTRACT OF THE DISCLOSURE

A camera which has a shutter with an adjustable sector-shaped opening that moves past the objective. The size of the adjustable shutter opening is controlled by a photocell. The photocell can be masked to compensate for changes in the diaphragm opening.

---

Cameras are known which are provided with photoelectric light indicator means including a photocell arranged in the optical viewfinder of the camera and which is used for the proper adjustment of the exposure time and the shutter opening, under consideration of the light sensitivity of the film used and of the filter factor of any filter used during the exposure. In these systems, the exposure time is usually exclusively controlled by adjustment of the objective shutter. This will result in a sometimes undesirable and in addition in a non-controllable depth of focus, for instance during taking of pictures of street scenes, photographs of children or photographs of sport events and in such cameras an undesirable sharpness during taking of slow motion pictures is usually unavoidable. The depth of focus can especially not be predetermined when the objective shutter is automatically controlled from the light meter, since when the light conditions during taking of the pictures change the shutter opening and correspondingly the depth of focus changes continuously. Camera constructions are already known which are provided with additional means for changing the exposure time. However, these additional means are not adapted to be easily adjusted during taking of the pictures and/or they are dependent on the adjustment of the shutter and therewith from the adjustment according to the film sensitivity. These known constructions do not permit a desired most favorable adjustment of the definition of the image and the known constructions, which include a great number of gears, racks, cams and lever constructions, etc., are extremely complicated and therefore expensive. The great number of adjusting elements provided in the known cameras make also a proper adjustment within the necessary short time complicated, and the known constructions require also relatively large space and can therefore not be used in a miniature camera.

It is an object of the present invention to overcome the above-mentioned shortcomings of cameras with photoelectric light meters.

It is a further object of the present invention to provide for a camera with a photoelectric light meter which can be adjusted to a desired depth of focus.

It is an additional object of the present invention to provide for a camera of the aforementioned type which is composed of relatively few and simple parts so that the camera can be constructed at relatively small cost and so that the camera will operate trouble-free during extended use.

With these objects in view, the camera according to the present invention mainly comprises a camera housing, an objective mounted on the camera housing, shutter means having an adjustable sector-shaped shutter opening movably past the objective so that the exposure time of the camera is determined only by the adjusted shutter opening, a viewfinder mounted on the housing, photoelectric light indicator means visible through the viewfinder and including a photocell, adjusting means for adjusting the shutter opening diaphragm means movable in front of the photocell for covering the latter to a greater or lesser degree, and means coupling said adjusting means to said diaphragm for moving the latter during adjustment of the shutter opening in front of the photocell to cover the latter to a greater or lesser degree in such a manner that during reduction of the opening the uncovered portion of the photocell is correspondingly reduced and vice versa.

The shutter means preferably include a pair of sector-shaped shutter blades having each a radial edge and being mounted adjustable with respect to each other about an axis parallel to the optical axis of the objective to define between the edges thereof the sector-shaped adjustable opening which is rotated past the objective so that the exposure time is determined by the sector-shaped opening of the rotating shutter blades.

Due to the fact that during an exposure only the exposure time and not as usual the objective shutter is regulated one obtains always an optimum definition of the image. The desired depth of focus obtained by adjusting of the camera by means of the range finder and adjustment of the objective shutter will thereby not change during taking of the pictures. The necessary adjustment of the light meter for different objective shutters, filter factors and light sensitivity of the film used is provided in the camera of the present invention by means of additional diaphragms movable into the path of light rays to the photocell of the light meter. By thus providing separate means for adjusting the light meter according to the exposure time, the objective shutter used, and to the filter factor, as well as the light sensitivity of the used film it is possible to provide for a camera of relatively simple construction, small space requirements and producible at relatively small cost which can be easily and foolproofly adjusted. The adjustment of the light meter to the sensitivity of the film used is preferably carried out by one or a plurality of switches by means of which electrical resistances may be connected to or disconnected from the circuit of the photocell of the light meter. By adjusting of the sector-shaped opening of the shutter it is possible to adjust the exposure time and to bring the pointer of the light meter in coincidence with a fixed marking on the optical viewer system.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 schematically illustrates the means for adjusting of the sector-shaped shutter opening and simultaneous adjustment of the uncovered area of the photocell of the light meter. FIG. 1 also illustrates a filter movable in front of the objective and corresponding means for adjusting the photocell;

FIG. 2 is a cross sectional view through part of the camera according to the present invention and showing also part of a film cassette mounted on the camera;

FIG. 3 is a partial schematic front view illustrating a shutter blade provided with a pair of openings of different size which are respectively alignable with the optical axis of the objective of the camera and means coupled to the shutter blade for adjusting the light impinging on the photocell during adjustment of the shutter blade;

Figure 7:
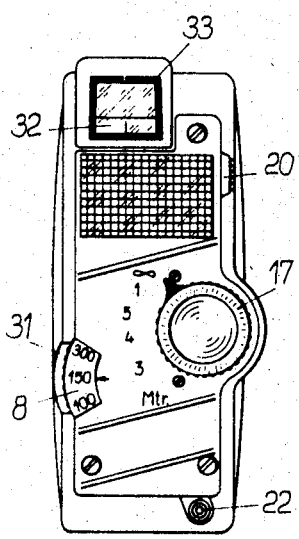
Figure 8:
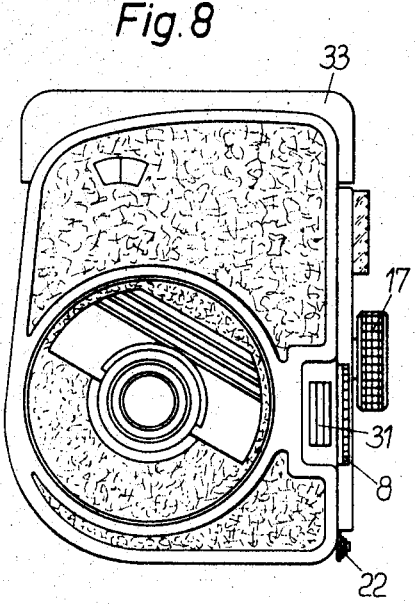

FIGS. 4 and 5 respectively illustrate different embodiments of wiring diagrams for adjustment of the light meter according to the sensitivity of the film used;

FIG. 6 schematically illustrates a photocell to be used in connection with the mechanism shown in FIG. 1 to obtain a linear adjustment of the current obtained by the photocell;

FIG. 7 is front view of the camera according to the present invention;

FIG. 8 is a side view thereof; and

Figure 9:
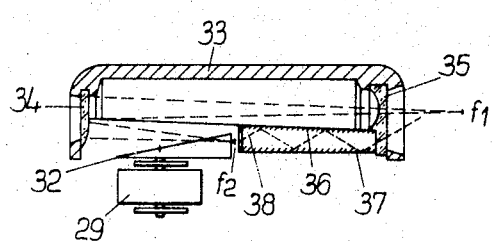

FIG. 9 is a schematic cross sectional view of the viewfinder arrangement including the light meter according to the present invention.

FIGS. 1 and 2 of the drawings illustrate by means of an example the adjustability of the shutter means of the camera according to the present invention by means of a planetary gear drive. The sector-shaped shutter blades 1 and 2 are mounted in the camera housing adjustable with respect to each other about an axis parallel to the optical axis of the objective 17 to define between adjacent radial edges of the blades 1 and 2 an adjustable sector-shaped opening 3. Each of the shutter blades 1 and 2 are respectively fixedly connected to gears 4 and 5 which respectively mesh with the sun gears 6 and 7 of the planetary gear drive so that the sector-shaped opening 3 may be adjusted by turning the adjusting segment 8, which is preferably provided at the outer periphery thereof with a knurled edge, and which carries the planet gears 9 and 10 turnable about a common shaft 11 and respectively meshing with the sun gears 6 and 7. The drive mechanism for rotating the sector-shaped thus adjusted opening 3 past the objective 17 does not form part of the present invention and is therefor not illustrated in the drawings.

A pin 12 projects substantially normal from the segment 8 fixed thereto eccentrically arranged with respect to the axis of turning of the segment 8 and the pin 12 is located in a slot of a diaphragm 13 movable in front of the photocell 15 of the light meter of the camera. When the segment 8 is turned in direction of the arrow 14 so that the sector-shaped opening 3 is reduced to the size illustrated in dotted lines in FIG. 1, the diaphragm 13 is likewise moved in upwards direction by the pin 12 in front of the photocell 15 so that only a small portion of the latter corresponding to the adjusted sector-shaped opening 3 remains uncovered. The diaphragm is guided during such movement by means not shown in the drawing. Since the adjustment of the sector-shaped opening 3 proceeds substantially linear, whereas the diaphragm 13 moved by the eccentrically arranged pin 13 is moved in a non-linear manner, the photocell 15 may be provided at lateral portions thereof for instance with fixed covers 15' of appropriate shape as shown in FIG. 6 to provide for a linearized adjustment of the current obtained from the photocell.

FIGS. 1 and 2 illustrate also an additional diaphragm 16 having an opening 18 usually aligned with the optical axis of the objective 17 and carrying also a color filter 19 vertically spaced from the opening 18. The additional diaphragm 16 is movable by means of a projecting operating portion 20 in upward direction as indicated by the arrow to align the color filter 19 with the optical axis of the objective and during such adjustment, the upper portion of the diaphragm 16 is moved in front of the photocell 15 to cover a portion of the latter so that the photocell 15 is adjusted according to the filter factor of the color filter 19.

FIG. 3 illustrates a blade 21 having a pair of openings 21a and 21b of different size. Since in a miniature camera exposure times of about 1/25 to 1/800 of a second can be obtained with the rotating shutter means 1, 2 described above, while in a moving camera with sixteen pictures per second exposure times of about 1/32 to 1/1000 of a second may be obtained, it is absolutely sufficient to provide besides the fully open objective opening of, for instance, 1:2 or 1:2.8 only an additional opening adjustment of, for instance, 1:8 to satisfy all possible light conditions, and such an adjustment is obtained with the two openings 21a and 21b provided in the shutter blade 21.

When the blade 21 is adjusted from the position shown in FIG. 3 by pushing the operating button 22 towards the left, as viewed in FIG. 3 and as indicated by the arrow, so that the blade 21 turns in clockwise direction about the pivot pin 21' to align the smaller opening 21b with the axis of the objective 17, a partly light-permeable diaphragm 23 is moved by means of the crank lever 24, which is connected to the blade 21 and to a downward extension of the diaphragm 23 in the manner as shown in FIG. 3, in upward direction, as indicated by the arrow at the left side of the diaphragm 23, in front of the photocell 15. The diaphragm 23 may comprise, as shown in FIG. 3, a thin metal plate provided with a plurality of slots therethrough or the diaphragm may also be formed by raster plate or by a gray filter foil. The arrangement illustrated in FIG. 3 in which the diaphragm 23 is constituted by a metal foil provided with a plurality of slots arranged inclined to the direction of movement of the diaphragm 23 has proven especially advantageous because this arrangement will result in an exact adjustment of the exposure time with the diaphragm 13 even if the diaphragm 23 is moved in front of the photocell 15.

FIG. 4 illustrates an arrangement to adjust the indicator mechanism 29 of the light meter to four different film sensitivities and this arrangement includes an adjustable switch 25 movable from the position shown in FIG. 4 into three adjusted positions in which electrical resistances 26 of different magnitude may respectively be electrically connected into the circuit between the photocell 15 and the measuring or indicator device 29.

FIG. 5 shows another arrangement for adjusting the photocell 15 to the light sensitivity of the film used. In this arrangement two switches 27 and 28 are used which cooperate with a pair of electrical resistances 26 of different magnitude to connect the latter into the electrical circuit of the photocell 15 or to disconnect the resistances therefrom. The switches 27 and 28 are preferably arranged in the housing of the camera in such a manner that if a film cassette 31 provided with a projection 30, as shown in FIG. 2, is inserted into the camera the projection 30 will protrude through an opening in a wall in the camera to engage one of the switches, for instance the switch 27 as shown in FIG. 2, and to close the same so that the resistance 26 connected to the switch 27 is connected into the circuit of the photocell 15. When the film cassette is not provided with the projection 30 both of the switches remain open and the maximum current produced by the photocell will pass through the measuring device 29 which is thereby adjusted to the highest film sensitivity, for instance to 21 DIN. If the film cassette is provided with a projection 31 which cooperates for instance with the switch 27, then the circuit of the light meter is adjusted for instance to film sensitivity 18 DIN, whereas if the projection 30 on the cassette 31 is arranged to cooperate with the switch 28 the circuit may be adjusted for instance to a film sensitivity of 15 DIN.

FIGS. 1 and 3 are drawn substantially to scale, whereas in FIG. 2 the transverse dimensions of the various elements and the spacings therebetween are for clarity's sake greatly exaggerated. Actually, the diaphragms 13, 16 and 23 as well as the shutter blade 21 have a thickness of about 0.1 to 0.2 mm. and may be arranged loosely abutting against each other without the danger that they will interfere with each other during the adjustment thereof.

FIGS. 7 and 8 illustrate an 8 mm. film camera in actual size and the various actuating mechanisms for the film camera can be clearly ascertained in these two figures. The adjustment segment 8 is preferably, as illustrated in these two figures, arranged in close vicinity of the shutter release button 31 so that these two elements may be separately or simultaneously operated with one finger. The adjustment of the pointer 32 of the measuring device 29, which is visible in the viewfinder 33, may therefore be carried out while the picture is taken. The adjusting button 22 for the above described shutter blade 21 is arranged at the bottom and to the right side of the cameras, as viewed in FIG. 7, and the operating portion 20 for adjustment of the color filter 19 is arranged to the right-side and at an upper portion of the camera.

FIG. 9 shows by way of an example a viewfinder system according to the present invention in connection with the indicator or measuring device 29. The viewfinder 33 comprises an objective lens 35 and a bifocal occular lens 34 having the focal points f1 and f2 and a separating wall 36 separating the upper portion of the bifocal occular from the lower portion thereof. A light permeable opening is provided beneath the lens 35 and, by means of a reflecting surface on the separating wall 36 and a correspondingly reflecting wall 37 arranged spaced thereto, light penetrating through the aforementioned opening is directed onto the transparent scale 38 of the light meter. The measuring device 29 is mounted in the camera beneath the viewfinder system in such a manner that the pointer 32 thereof can move in front of the scale 38 to be observable together with the scale, which is fixed to the housing of the viewfinder, through the lower portion of the occular 34 while the viewer may observe the object to be photographed through the upper part of the occular.

It will be understood that each of the elements described above, or two or more together, may also find a useful application in other types of cameras differing from the types described above.

While the invention has been illustrated and described as embodied in a camera with photoelectric light meter, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be secured by Letters Patent is:

1. A camera with photoelectric light meter comprising, in combination, a camera housing; an objective mounted on said camera housing; shutter means having an adjustable sector-shaped shutter opening movable past said objective for determining the exposure time of the camera by the adjusted size of the sector-shaped opening; a viewfinder mounted on said housing; photoelectric light indicator means visible through the viewfinder and including a photocell; adjusting means in form of a planetary gear drive for adjusting said shutter opening; diaphragm means movable in front of said photocell for covering the latter to a greater or lesser degree; and means coupling said adjusting means to said diaphragm for moving the latter during adjusting of said shutter opening in front of said photocell to cover the latter to a greater or lesser degree in such a manner that during reduction of said opening the uncovered portion of said photocell is correspondingly reduced and vice versa.

2. A camera as set forth in claim 1, wherein said shutter means include a pair of sector-shaped shutter blades having each a radial edge and being mounted adjustable with respect to each other about an axis parallel to the optical axis of said objective to define between said edges said sector-shaped adjustable opening.

3. A camera as set forth in claim 1, and including a blade having a pair of openings of different size, said blade being mounted in said housing for movement between a first position in which the larger one of said pair of openings is aligned with the optical axis of said objective and a second position in which the smaller one of said pair of openings is aligned with the optical axis of said objective, means fixed to said shutter blade for moving the latter between said positions thereof, and a partly light-permeable diaphragm connected to said last-mentioned means to be moved in front of said photocell during movement of said blade from said first to said second position thereof.

4. A camera as set forth in claim 3, wherein said partly light-permeable diaphragm is constituted by a raster plate.

5. A camera as set forth in claim 3, wherein said partly light-permeable diaphragm is constituted by a plate formed with a plurality of slots therethrough.

6. A camera as set forth in claim 3, wherein said partly light-permeable diaphragm is constituted by a gray filter.

7. A camera as set forth in claim 1, and including a color filter movable from an inactive position to an active position aligned with the optical axis of said objective, an additional diaphragm, and means coupling said color filter with said additional diaphragm to move said additional diaphragm in front of a predetermined portion of said photocell when said color filter is moved to said active position thereof.

8. A camera as set forth in claim 7, wherein said photoelectric light indicator means includes means for adjusting said light indicator means according to the light sensitivity of the film used in the camera, said last-mentioned means including at least one electrical resistance and a switch for connecting said resistance into the circuit of said light indicator means and to disconnect the resistance therefrom.

9. A camera as set forth in claim 8, and including a cassette for housing a film of a given light sensitivity, said cassette being provided with at least one projection arranged and constructed to close said at least one switch when said cassette is placed in said camera.

10. A camera as set forth in claim 1, wherein said adjusting means has an operating portion projecting from said camera housing, and including a shutter release button arranged closely adjacent said operating portion so that the latter and said button may be simultaneously or separately operated with one finger.

11. A camera as set forth in claim 1, wherein said light indicator means includes a measuring device having a scale and being arranged adjacent and below said viewfinder, wherein said viewfinder includes a bifocal occular having an upper and a lower portion and separating wall separating said portions from each other so that said scale and the object to be photographed may simultaneously be observed through said lower and said upper portion of said occular, respectively.

12. A camera as set forth in claim 11, wherein said viewfinder includes a housing, said scale being fixed to said viewfinder housing, said housing being provided with a front opening and including reflecting wall portions constructed and arranged to direct light rays entering through said opening in said viewfinder housing onto said scale to illuminate the latter.

13. A camera as set forth in claim 2, wherein said adjusting means include an adjusting segment turnable about a first axis, a pair of sun gears of different diameters turnable about said first axis, a pair of planet gears carried by said segment turnable about a second axis eccentrically arranged with respect to said first axis and respectively meshing with said pair of sun gears, and a pair of gears respectively fixed to said shutter blades coaxially arranged with said axis parallel to said optical axis and respectively meshing with said sun gears, and wherein said coupling means comprises a pin fixed to said adjusting segment eccentrically arranged with respect to said first axis and engaging said diaphragm.

(References on following page)

References Cited

UNITED STATES PATENTS

| | | | |
|---|---|---|---|
| 2,080,055 | 3/1937 | Martin | 352—141 |
| 3,000,281 | 9/1961 | Rentschler | 95—10 |
| 3,099,193 | 7/1963 | Freudenschuss | 352—141 |
| 3,116,659 | 1/1964 | Waroux | 352—141 |
| 3,117,504 | 1/1964 | Steisslinger | 352—216 |
| 3,186,003 | 5/1965 | Gregory et al. | 352—208 |
| 3,266,398 | 8/1966 | Kremp et al. | 95—10 |
| 3,276,339 | 10/1966 | Anwyl | 95—10 |

FOREIGN PATENTS

| | | |
|---|---|---|
| 9,043 | 4/1914 | Great Britain. |
| 1,027,983 | 4/1958 | Germany. |

NORTON ANSHER, *Primary Examiner.*

R. A. SCHROEDER, *Assistant Examiner.*

U.S. Cl. X.R.

95—10